July 23, 1963 E. MARSH 3,098,378
CORE RELEASE TEST FIXTURE
Filed Feb. 16, 1962 2 Sheets-Sheet 1

INVENTOR.
Erwin Marsh
BY
S. J. Rotondi & A. J. Dupont

July 23, 1963 E. MARSH 3,098,378
CORE RELEASE TEST FIXTURE
Filed Feb. 16, 1962 2 Sheets-Sheet 2
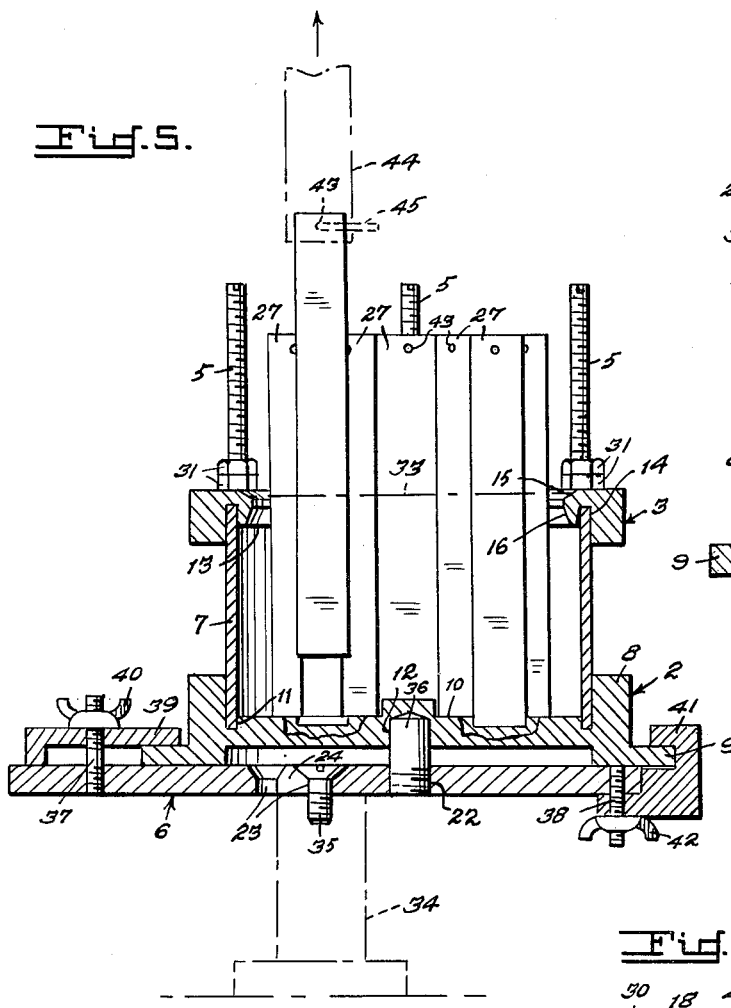
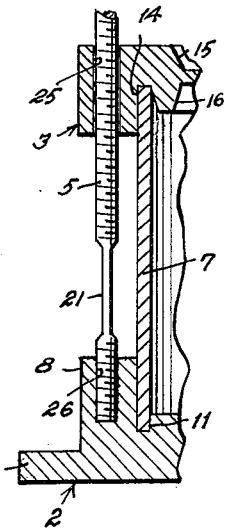
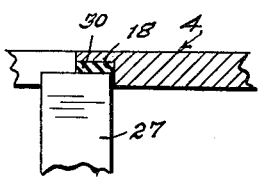
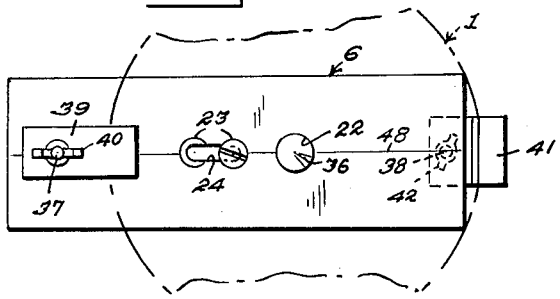
INVENTOR.
Erwin Marsh
BY
S.J. Rotondi + A.J. Dupont United States Patent Office 3,098,378
Patented July 23, 1963

3,098,378
CORE RELEASE TEST FIXTURE
Erwin Marsh, Marshall, Tex., assignor, by mesne assignments, to the United States of America as represented by the Secretary of the Army
Filed Feb. 16, 1962, Ser. No. 173,843
5 Claims. (Cl. 73—103)

This invention relates to a core release test fixture and more particularly to a fixture for testing various core release agents on standard size, calibrated, aluminum strips used as simulated casting cores and the fixture is for use with a tensile test machine employed in testing core release agents with all types of rocket motor propellants.

Rocket motor propellants of the solid type are usually poured in a molten state into molds to form a composite rocket propellant charge which is then cured. Cores are inserted before the molding operation to form bores, etc., that are required in the assembly of the propellant in the rocket motor.

The core must be removed after the propellant is cured and without damaging the increment by sticking to the propellant.

Therefore, the cores must first be coated with a release agent to prevent sticking of the core to the propellant and to facilitate removal of the core after the propellant is cured.

The aluminum strips are coated with various core release agents and are supported in a fixture which is filled with a propellant and cured. After curing, the fixture is placed in a tensile test machine which lifts each strip out of the propellant whereupon the release force of the strips are measured and recorded graphically.

It is therefore a primary object of this invention to provide test fixture for supporting a series of coated aluminum test strips for testing in a tensile test machine for testing all types of core release agents with all types of propellants.

Another object is to provide an adapter plate for attachment to a core release test fixture by which the fixture can be rotated into position for succeeding tests in a tensile test machine.

A further object is to provide a core release test fixture that may be quickly and easily assembled.

The specific nature of the invention as well as other objects and advantages thereof, will clearly appear from a description of a preferred embodiment as shown in the accompanying drawings in which:

FIGURE 5 is an axial section of the fixture in its assembled relation for testing, portions of a tensile test machine being shown in broken lines;

FIGURE 6 is a top plan view of the clamp plate;

FIGURE 8 is a sectional detail view taken along lines 8—8 of FIGURE 2 and looking in the direction of the arrows, and, FIGURE 9 is a sectional detail view taken along lines 9—9 of FIGURE 1 and looking in the direction of the arrows.

Figure 1:
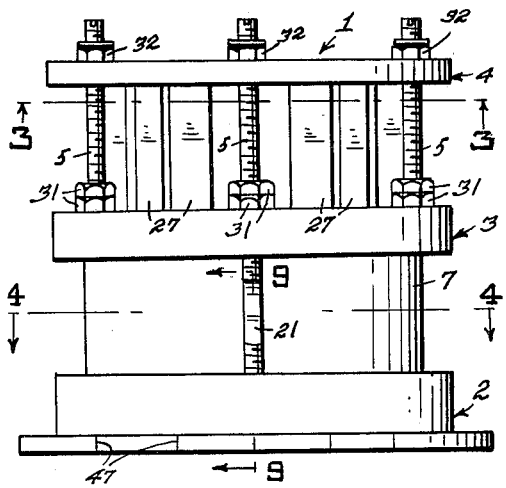
FIGURE 1 is a side elevation of the core release test fixture of the invention in assembly for casting.

Referring now to the drawings, reference character 1 represents the core release test fixture assembly in toto.

The fixture comprises essentially a circular base indicated generally by 2, a holding ring, indicated generally by 3, an alignment plate, indicated generally by 4, a series of tie rods 5, a clamp plate, indicated generally by 6 and a cardboard case 7.

Base 2 consists of a cup like member having a rim 8 and an annular flange 9. Its floor 10 is provided with an annular groove 11 and a smooth central bore 12.

Holding ring 3 is provided with an undercut portion 13 having an annular groove 14 of the same diameter as groove 11. The inner rim of ring 3 is further provided with beveled edges 15 and 16 for ease of assembly.

Figure 3:
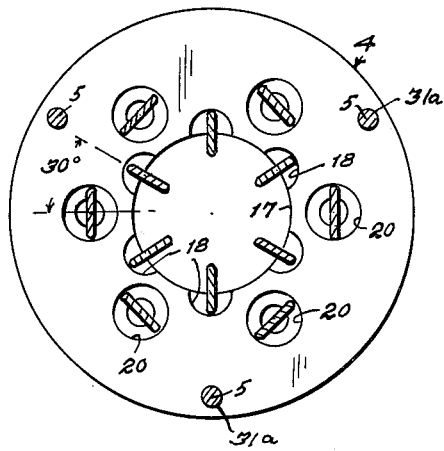
FIGURE 3 is a cross section view taken along lines 3—3 of FIGURE 1 and looking in the direction of the arrows.
Figure 2:
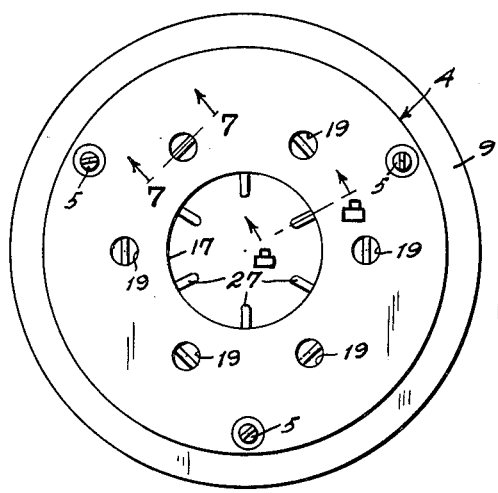
FIGURE 2 is a top plan view of the fixture.

The alignment plate 4 is provided with a central bore 17 (see FIGURE 3). Symmetrically arranged around the inner peripheral surface of bore 17 is a series of semicircular recesses 18 which are disposed on the under side of plate 4, as best seen in FIGURE 8; another series of bores 19 are arranged circumferentially and in radially spaced relation with recesses 18 in plate 4. Bores 19 are counterbored as at 20.

Each tie rod 5 is threaded at each of its ends (see FIGURE 9) and is flattened along a portion 21 for application of a wrench or like tool when turning the tie rod.

The clamp plate 6 is a rectangular plate having a threaded central bore 22 and a pair of countersinks (see FIGURE 6) 23.

Bore 22 and countersinks 23 are in longitudinal alignment and in spaced arrangement on plate 6. Countersinks 23 communicate with each other by a slot 24.

The fixture is assembled for casting a propellant therein to be tested as follows:

Case 7 is placed with its bottom rim in annular groove 11 of base 2 and its top rim is fitted into annular groove 14 in holding ring 3.

Each tie rod 5 is passed through a smooth bore 25 provided in holding ring 3 (see FIGURE 9), then screwed into a threaded bore 26 in base 2. There are shown three tie rods and three smooth bores 25 and threaded bores 26. While the aforesaid bores and tie rods as shown, are three in number, more may be used if expedient.

Figure 4:
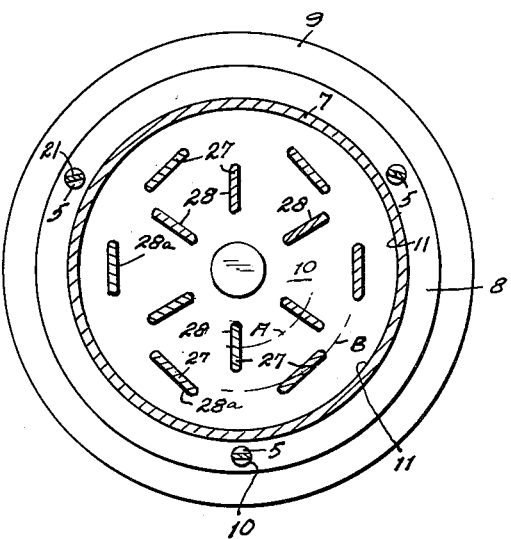
FIGURE 4 is a cross section view taken along lines 4—4 of FIGURE 1 and looking in the direction of the arrows.

Calibrated aluminum test strips 27 having a Teflon coating are again coated with a core release agent to be tested, and are inserted at their lower ends into slots 28 and 28$^a$ which are symmetrically arranged in floor 10 of base 2 as seen in FIGURE 4. Slots 28 and 28$a$ correspond in number to, and are in alignment with, recesses 18 and counterbores 20 in alignment plate 4. Slots 28 and recesses 18 extend radially, while slots 28$^a$ and counterbores 20 are arranged circumferentially about slots 28 and recesses 18 respectively.

Figure 7:
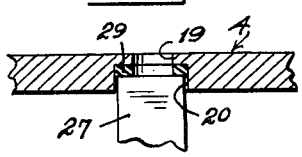
FIGURE 7 is a sectional detail view taken along lines 7—7 of FIGURE 2 and looking in the direction of the arrows.

As seen in FIGURE 7, counterbores 20 in the alignment plate 4 have resilient washers 29 and semicircular recesses 18 as shown in FIGURE 8 have semicircular pads 30 inserted therein for purpose of protecting the strips 27.

This much of the assembly is now tightened by nuts 31.

The alignment plate 4 is then placed over strips 27, the upper ends of the strips 27 being received in the recesses 18 and counterbores 20. Tie rods 5 pass through an equal number of smooth bores 31$a$ in alignment plate 4.

The entire assembly is now tightened by cap nuts 32, and a molten propellant is poured to a level indicated by 33 into case 7 and is allowed to cure.

Now the fixture is ready to be placed in a tensile test machine.

Clamp plate 6 is screwed to a centering post 34, shown in broken lines in FIGURE 5, of a tensile test machine (not shown) by a screw 35.

A stud 36 which is threaded at one end is screwed into threaded bore 22 in plate 6 and its upper end is inserted in smooth bore 12 of base 2 and provides a pivot for fixture 1 to revolve around.

Plate 6 has threaded studs 37 and 38 screwed into each end thereof and in alignment with bores 23 and 22. Stud 37 rises upwardly from plate 6 and stud 38 extends downwardly therefrom. A clamp 39 is fastened by a wing nut 40 to flange 9 while a clamp 41 is fastened by a wing nut 42 to flange 9.

The fixture is now ready to be prepared for placement in a tensile test machine.

The alignment plate 4 is removed and a lifting element 44 is fastened to the strip 27 to be used in the test by a fastener 45 of the test machine which is inserted in a hole 43 in strip 27 provided at the upper end of each strip 27.

In operation, the fixture is to be rotated about pivot 36 for centering each test strip tested with post 34 and lifting element 44 for vertical alignment of the strip.

In order to position the test strips for each test, their position is marked as at 47 on flange 9, and a longitudinal line is engraved on the upper side of clamp plate 6.

It will be observed from FIGURE 4 that the test strips 27 are twelve in number and are arranged in circular rows A and B.

In order to position each test strip for testing, the clamps 39 and 41 are loosened, the clamp 41 being stationary, and the base 2 is turned until longitudinal line 48 on plate 6 aligns with the desired indicia 47 on flange 9 and clamp 39 is tightened. Then lifter 44 lifts out the respective strip 27 which is to be used for testing a core releasing agent.

This process is repeated until the strips are lifted out.

Since the center line of each strip is disposed radially 30°, rotation of the base 60° is necessary to bring each test strip in each row into alignment for lifting.

Hence for lifting each strip, the base is rotated 30°.

All the strips in rows A and B may be brought into testing alignment by rotating the base until all the strips in a row are pulled out, then shifting the plate 6 so that screw 35 is received in another countersink and merely rotating the base 2 again until all the strips in that row are pulled out. Also each strip in both rows may be successively lifted if desired.

It is apparent that the core release test fixture provides reliability of results through accuracy of casting the propellant always to the same height of the calibrated test strips which provides the same size of propellant contact area, simplicity in assembly and handling from casting through release tests, its adaptability to any tensile test machine and economy in use since the cardboard tube 7 and its propellant is disposable after testing and requires no "soak out" or time consuming cleaning.

Variations and modifications may be effected without departing from the scope of the novel concept of the present invention as set forth in the appended claims.

What is claimed is:

1. A test fixture for supporting a series of test strips which are coated with a core release agent for successive testing in a tensile test machine, said fixture comprising in combination a circular base for holding the lower ends of said strips in symmetrical spaced relation, a tubular case for holding a propellant therein and encircling the test strips, the lower rim of said case being fitted in said base, a holding ring fitted over the upper rim of said case, an alignment plate for holding the upper ends of the test strips in vertically aligned relation with respect to the axis of said fixture, adjustable means for securing said case between said base and said holding ring and the test strips between said base and said alignment plate and means for rotating and shifting said fixture through successive testing positions with respect to the test machine.

2. A test fixture as claimed in claim 1 wherein said circular base is provided with a first series of radially extending slots and a second series of slots arranged circumferentially about said first series of slots, the center of each slot in said first series being spaced 30° from the center of a slot in said second series, said first and second series of slots being adapted to receive the lower ends of the test strips therein.

3. A test fixture as claimed in claim 1 wherein said alignment plate is provided with a central bore, there being a series of semicircular, radially extending recesses in the under side of said plate and arranged along the edge of said central opening and a series of counterbores in the underside of said plate and arranged in circumferential relation around said semicircular recesses, the center of each semicircular recess being spaced 30° from the center of a said counterbore, said semicircular recesses and said counterbores being adapted to receive the upper ends of the test strips therein.

4. A test fixture as claimed in claim 1 wherein said adjustable means for securing said base, holding ring and alignment plate comprises, a series of threaded vertical bores in said base, a corresponding series of smooth bores in said holding ring and said alignment plate and a series of threaded rods adapted to be passed through said smooth bores in said alignment plate and said holding ring and to be threadably engaged in said threaded bores in said base and a nut adapted to be screwed on each rod against said holding ring and a cap nut adapted to be screwed on the upper portion of each said rod against said alignment plate.

5. A test fixture as claimed in claim 1 wherein said means for rotating and shifting said fixture comprises a rectangular plate for rotatably mounting said fixture in the tensile test machine, said plate being provided with a pair of spaced countersinks, there being a slot in communication with said countersinks, a screw riding in said countersinks and said slot and securing said plate to a portion of the test machine, an upstanding stud fixed to said plate and received centrally in the bottom of said base and a releasable clamp fixed to each end of said plate whereby said plate may be held against rotation, said countersinks, slot, stud and clamps being arranged in longitudinal alignment.

References Cited in the file of this patent
UNITED STATES PATENTS

| | | |
|---|---|---|
| 2,049,951 | Doan | Aug. 4, 1936 |
| 2,447,660 | Miklowitz | Aug. 24, 1948 |
| 2,493,382 | Bell | Jan. 3, 1950 |